(12) United States Patent
Kaiho (10) Patent No.: US 9,998,477 B2
(45) Date of Patent: Jun. 12, 2018

(54) DIGITAL CONTENT ACCESS CONTROL

(71) Applicant: Comcast Cable Communications, LLC, Philadelphia, PA (US)

(72) Inventor: Nicholas Kaiho, Frederick, MD (US)

(*) Notice: Subject to any disclaimer, the term of this patent is extended or adjusted under 35 U.S.C. 154(b) by 34 days.

(21) Appl. No.: 14/675,366

(22) Filed: Mar. 31, 2015

(65) Prior Publication Data

US 2016/0294843 A1   Oct. 6, 2016

(51) Int. Cl.
| | |
|---|---|
| *G06F 21/10* | (2013.01) |
| *H04L 29/06* | (2006.01) |
| *G06F 21/62* | (2013.01) |
| *H04W 12/08* | (2009.01) |
| *H04L 29/08* | (2006.01) |
| *G06F 17/30* | (2006.01) |
| *G06F 17/22* | (2006.01) |

(52) U.S. Cl.
CPC ........ *H04L 63/108* (2013.01); *G06F 17/2235* (2013.01); *G06F 17/30887* (2013.01); *G06F 21/10* (2013.01); *G06F 21/6218* (2013.01); *H04L 67/02* (2013.01); *H04L 69/28* (2013.01); *H04W 12/08* (2013.01); *G06F 2221/2137* (2013.01)

(58) Field of Classification Search
CPC ... H04L 63/108; H04L 61/3045; H04L 69/28; H04L 67/02; G06F 17/2235; G06F 21/10; G06F 17/30887; G06F 21/6218; G06F 2221/2137; H04W 12/08
USPC ........................................................ 726/30
See application file for complete search history.

(56) References Cited

U.S. PATENT DOCUMENTS

| | | | | |
|---|---|---|---|---|
| 7,394,900 B1* | 7/2008 | Gerber | ................ | G06F 21/6263 380/259 |
| 8,042,063 B1* | 10/2011 | Lin-Hendel | ........... | G06F 3/0482 715/805 |
| 8,214,443 B2* | 7/2012 | Hamburg | ............. | G06Q 10/107 709/206 |
| 8,392,585 B1* | 3/2013 | Balwani | ................ | G06F 19/363 709/224 |
| 8,438,312 B2* | 5/2013 | Kapur | ..................... | H04L 67/32 370/230 |
| 8,543,668 B1* | 9/2013 | Long | ................. | G06F 17/30864 709/217 |
| 8,880,711 B2* | 11/2014 | Cui | .................... | G06F 17/30861 709/217 |
| 9,075,777 B1* | 7/2015 | Pope | ................... | G06F 17/2235 |
| 9,494,931 B2* | 11/2016 | Caldwell | .......... | G05B 19/41845 |
| 9,621,583 B2* | 4/2017 | Varadarajan | ........ | H04L 63/1491 |

(Continued)

FOREIGN PATENT DOCUMENTS

JP      2001356983 A     12/2001

*Primary Examiner* — Abu Sholeman
(74) *Attorney, Agent, or Firm* — Baker & Hostetler LLP (57) ABSTRACT

Access to a linked resource may be protected using a time-based transformation of links to the resource. A linked resource may be transmitted to a browser in a markup language page. Information indicative of a time-based transformation of a link may be transmitted to the browser in the markup language page, or separately from the markup language page. The time-based transformation may be applied to the transmitted link. The transformed link may be requested, and compared to a version of the link that has been transformed, using the time-based transformation with respect to the time the request is received.

20 Claims, 6 Drawing Sheets

(56) References Cited

U.S. PATENT DOCUMENTS

| | | | | |
|---|---|---|---|---|
| 9,692,804 B2* | 6/2017 | Ostroumova | | H04L 67/02 |
| 9,860,143 B2* | 1/2018 | Bissantz | | H04L 43/045 |
| 2002/0032905 A1* | 3/2002 | Sherr | | G06F 21/10 |
| | | | | 725/38 |
| 2002/0107986 A1* | 8/2002 | Pfohe | | H04L 29/12009 |
| | | | | 709/246 |
| 2007/0220270 A1* | 9/2007 | Murakami | | G06F 21/35 |
| | | | | 713/183 |
| 2009/0106358 A1* | 4/2009 | Mitsuoka | | G06F 17/30604 |
| | | | | 709/203 |
| 2010/0146607 A1* | 6/2010 | Piepenbrink | | G06F 21/6218 |
| | | | | 726/7 |
| 2010/0175136 A1* | 7/2010 | Frumer | | G06F 21/31 |
| | | | | 726/26 |
| 2011/0154443 A1* | 6/2011 | Thakur | | G06F 21/41 |
| | | | | 726/3 |
| 2012/0214443 A1* | 8/2012 | Daigle | | H04L 9/3228 |
| | | | | 455/411 |
| 2013/0291073 A1* | 10/2013 | Dec | | G06F 21/41 |
| | | | | 726/5 |
| 2014/0059029 A1* | 2/2014 | Magill | | G06F 17/30864 |
| | | | | 707/706 |
| 2014/0123236 A1* | 5/2014 | Hirata | | H04L 63/0807 |
| | | | | 726/4 |
| 2014/0180835 A1* | 6/2014 | Bitran | | G06Q 30/0241 |
| | | | | 705/14.73 |
| 2014/0351354 A1* | 11/2014 | Chandra | | H04L 51/046 |
| | | | | 709/206 |
| 2014/0379913 A1* | 12/2014 | Niimura | | H04L 67/34 |
| | | | | 709/225 |
| 2015/0193389 A1* | 7/2015 | Rose | | G06F 17/30887 |
| | | | | 715/208 |
| 2016/0004674 A1* | 1/2016 | Ostroumova | | G06F 17/3089 |
| | | | | 715/205 |
| 2016/0050249 A1* | 2/2016 | Powers | | H04L 65/601 |
| | | | | 709/223 |
| 2016/0182606 A1* | 6/2016 | Kaasila | | G06F 17/214 |
| | | | | 715/269 |
| 2016/0308928 A1* | 10/2016 | Gholmieh | | H04L 67/02 |
| 2016/0337320 A1* | 11/2016 | Mason | | H04L 63/0428 |
| 2016/0352804 A1* | 12/2016 | Foss | | H04L 67/02 |
| 2016/0364736 A1* | 12/2016 | Maugans, III | | G06Q 30/0201 |
| 2016/0364771 A1* | 12/2016 | Nielsen | | H04L 67/20 |
| 2017/0078414 A1* | 3/2017 | Arulesan | | H04L 67/22 |
| 2017/0287008 A1* | 10/2017 | Zheng | | G06Q 30/0264 |

* cited by examiner

DIGITAL CONTENT ACCESS CONTROL

BACKGROUND

Web pages often include links to media content and other resources that are accessed via a network such as the Internet. For example, a web page may comprise a link which, when selected by a user, causes the web browser to request and receive, e.g., via the Internet, a video, document, or other content from a server where the content is stored. A content provider may wish to restrict or limit access to resources that are accessible via a network. One approach for restricting access to content involves utilizing various digital rights management techniques, such as encryption, so that only those processes running on behalf of an authorized can decrypt and access the content. Another existing approach involves responding to requests to access content only when the request is accompanied by a cookie or other token indicating that a user's credentials have been verified and that the user is permitted to access the content.

SUMMARY

Systems and methods are described for limiting access to digital content by periodically changing links to the digital content so that only systems that are provided with information specifying how the links will change are able to access the content. In an example system, a content server may comprise various resources such as, for example, video files, digital documents, audio files, and network-based services that are accessible via a network such as the Internet. The resources may be accessed by requesting the content via a link that identifies the resource. According to an aspect of the described systems and methods, the content server may periodically change the link by which the resource may be accessed. For example, the content server may change the link every ten minutes, after which previous links are no longer valid. The process for changing the link is predetermined and based upon a baseline time.

When the content server provides the link by which the digital content may be accessed, the content server may also provide information regarding how to change link over time so as to be consistent with the changes that are expected by the content server. In an example scenario, the content server may receive a request for a web page that contains links to digital content. In addition to generating a hypertext markup language ("HTML") page and inserting links to digital content, the content server may communicate instructions for performing the time-based transformation of the link to the digital content. For example, the content server may include in the HTML instructions for performing the transformation of the content links.

The browser that requested the web page receives the HTML and renders the page. The browser may use the instructions for performing the time-based transformation of the link to change the content links as specified. For example, if the instructions indicate to change the link every ten minutes, the browser does so and according to the predetermined function specified in the HTML. When accessing the content, the browser may generate a transformed version of the original link and issue a request that includes the transformed link.

In an example embodiment, the content server may compare the link received from the browser to a transformed link generated by the content server using the predetermined process. If the received link corresponds to the transformed link generated by the content server, the content server determines to provide access to the requested content.

In some instances, the link received by the content server may not correspond to a transformed link generated by the content server. For example, the request may have been received from a device other than the one with which the original link was shared. For example, the original content link transmitted to a web browser may have been pasted into a separate document or browser. In such an instance, the requesting device may not have the instructions indicating the manner and timing for changing the link. Accordingly, when the request using the link is received at the content server, the content server may determine that it does not correspond to a transformed version of the link that it has generated according to the predetermined process. In such a scenario, the content server determines that the request for the content should be denied.

Aspects of the present disclosure may be utilized to restrict access to resources using a time-based transformation of a link. A markup language page may be transmitted to a browser. The markup language page may contain a link to a resource hosted by a content server. Instructions for performing a time-based transformation of the link may also be transmitted to the browser, embedded in or sent independently from the markup language page. A browser may transform the link according to the time-based transformation. In response to receiving a request directed to the transformed link, a server may determine that the received transformed link conforms to its expectation of a link transformed according to the time-based transformation, and may permit access to the resource. This configuration may restrict access to content in some cases, such as when links to content are shared or embedded in web pages not authorized to re-use the resource, while having reduced complexity as compared to typical digital rights management techniques.

Additional advantages will be set forth in part in the description that follows or may be learned by practice. The advantages will be realized and attained by means of the elements and combinations listed in the appended claims. Both the foregoing general description and the following detailed description are exemplary and explanatory only.

BRIEF DESCRIPTION OF THE DRAWINGS

The accompanying drawings are incorporated in and constitute a part of this specification. Together with the description, the drawings may serve to explain operational principles of various methods, systems, computer-readable media, and computer program products described herein. For the purposes of illustration, various examples of aspects of the disclosure are shown in the drawings; however, the invention is not limited to the specific methods and instrumentalities that are described.

DETAILED DESCRIPTION

The methods and systems described herein restrict access to digital content using a time-based transformation of a link. In an example scenario, a content server generates data for a web page including a link to digital content such as, for example, a company logo, a media file, a video stream, etc. The generated data further comprises information indicating a predetermined process for transforming the link over time so that a client device processing the link, by an executable process such as a web browser, may transform the link to maintain compatibility with the version of link that will be used by the content server. A web browser may receive the generated data, render the web page, and modify or transform the link as specified by the received instructions. When the transformed link is accessed by the browser, a request is received at the content server for the resource that corresponds to the transformed link. The content server compares the received link with a transformed link generated by the content server using the predetermined process. If the received link matches the version of the transformed link expected by the content server, the content server provides the request resource to the browser. If the content server receives a request for content and the received link does not match the version of the transformed link expected by the content server, access to the content is denied. For example, if the request was received from a client device that has the link to the content, but does not have the instructions for transforming the link, the content server may deny access to the resource.

Figure 1:
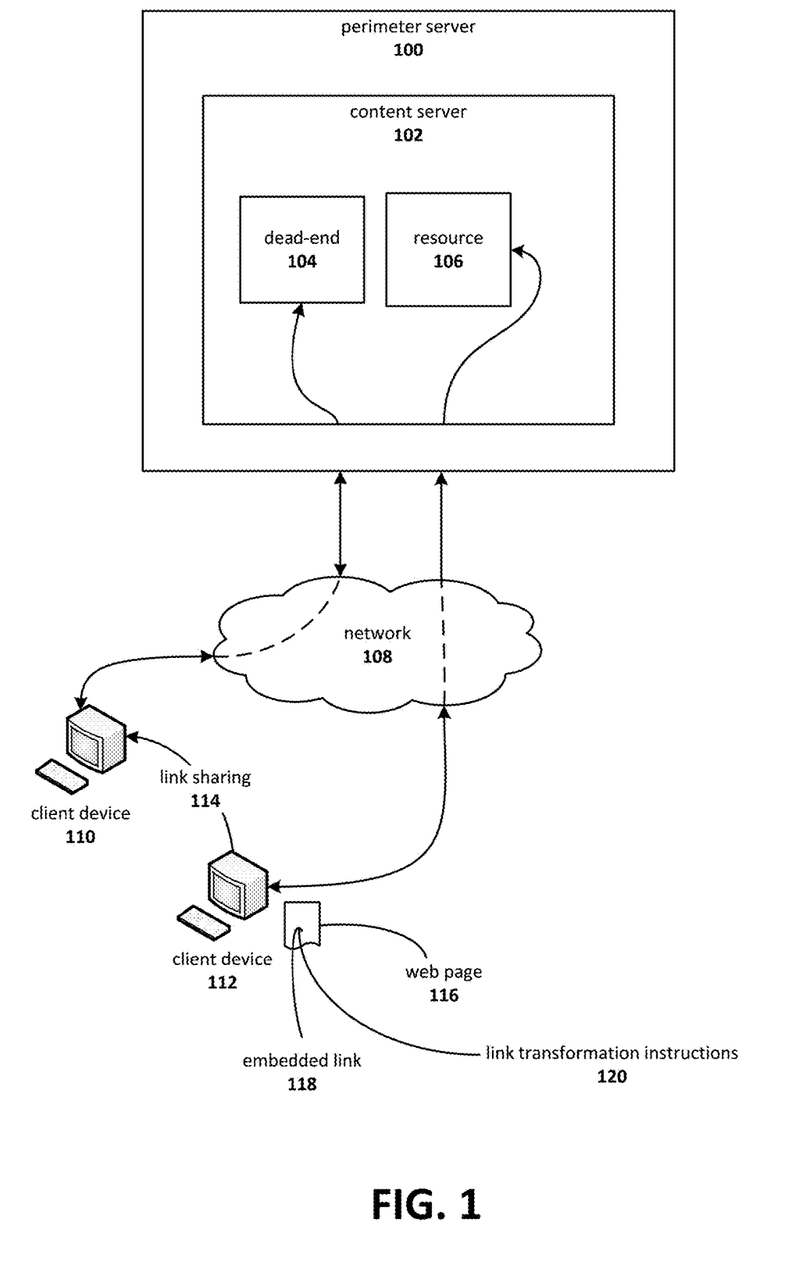
FIG. 1 depicts an example system adapted to control access to digital content.

FIG. 1 depicts various aspects of a system for providing access to a resource identified by a link, where access to the resource is restricted using a time-based transformation of the link. Instructions for performing the time-based transformation may be transmitted to a client process, and may be used to form a version of the link that is non-expired as of the time of transformation.

As used herein, a link may include various means of identifying content or other resources available at a content server. A link may, for example, include information such as a network domain, real or virtual directory paths, location information, and so on. A link may comprise a uniform resource locator ("URL"). In some embodiments, a link may comprise an alphanumeric or numeric identifier, with or without information such as a network domain or directory path.

A content server 102 may generate a web page 116 that may include an embedded link 118. The embedded link 118 may correspond to a content file or other resource accessible through content server 102. A client device 112 may receive the web page 116 transmitted from the content server 102 over a network 108. The web page 116 may include the embedded link 118 that refers to the resource 106 that is hosted on the content server 102. In some instances, the embedded link 118 may be shared or copied by a party other than an owner of the content provided by the content server 102. This process may be referred to as link sharing 114. It may include, for example, cases where a user forwards a link to a friend, or where an operator of a web site attempts to appropriate content hosted on the content server 102, such as the resource 106. These actions may typically occur without the consent of the owner of the content hosted on the content server 102. It may therefore be the case that an attempt, for example, by a client device 110, to use a copy of the embedded link 118 to access the resource 106 should not be successful, in accordance with the wishes of the owner of resources hosted on the content server 102 to protect access to the owned resources.

The client device 112, upon or after receiving a web page 116, may initiate a request to access the resource 106 by transmitting, for example, an HTTP request to the content server 102 directed to the embedded link 118. The use of HTTP as an example is intended to be illustrative, and should not be viewed as limiting the scope of the present disclosure. Other examples of transmitting a request to access the resource 106 might include or involve remote procedure calls, email addresses, message queues, and so forth. More generally, various forms of request-response protocols may be used, such as those involving an address or name-based identification of a requested resource. Similarly, the term link is used herein for illustrative purposes. Use of the term link is not intended to limit the scope of the present disclosure to access mechanisms that involve HTTP. A link may refer to any of various address or name-based mechanisms for identifying resources through a request-response protocol.

At the content server 102, the request may be intercepted by a perimeter server 100. Although FIG. 1 depicts the perimeter server 100 as existing outside of the content server 102, it may be the case that the perimeter server 100 is implemented within the content server 102 as a component. For example, the perimeter server 100 may be implemented as part of a request processing pipeline within a web server process operating on the content server 102.

A perimeter server 100 may allow access to the resource 106 based on receiving a request directed to the embedded link 118. The perimeter server 100 may provide access to the resource 106 based on receiving the request to the embedded link 118 for a time period following transmission of a web page 116. This may, for example, allow for the web page 116 to retrieve associated images, animations, video, and sound files referred to by the web page 116 as part of an initial rendering process.

During the time period in which the perimeter server 100 may allow access to the resource 106 based on receiving a request directed to the embedded link 118, link sharing 114 may allow the client device 110 to access the resource 106 using a copy of embedded link 118. However, the perimeter server 100 may, after a time period has elapsed, deny access to the resource 106 based on receiving a request directed to the embedded link 118. Accordingly, after the time period has elapsed, copies of the embedded link 118 may no longer be usable to access the resource 106.

The web page 116 may include instructions for transforming a link based upon the current time. The instructions for performing the transformation may be referred to as time-based transformation instructions 120. The time-based transformation instructions 120 may be, for example, a software module, such as a function or procedure, which accepts the first link, a baseline time, and a current time as input, and further relies on an interval as a basis of a time period for link validity. The output of the function may be a link. The output link may be different after each time period has elapsed, although in some cases values of the output link may repeat on occasion. For example, a procedure for calculating a time-based transformation might accept values including a base link "./example/resource.html", a time interval "00:05:00", and a current time "12:00:00" as input, and return the value "./example/resource.html/1" as output. At a time "12:06:00," the output of the function might be "./example/resource.html/2." The function might be structured so as to wrap around to a starting point, so that at some later time the function might again return a value of "./example/resource.html/1." In another example, a function might accept as input a number of time periods that has elapsed since a baseline time. Information describing the length of the time period and a baseline time might also be provided to the client device 112 as part of the time-based transformation instructions.

The time-based transformation instructions 120 may be included in the web page 116. In some instances, the presence of the time-based transformation instructions 120 may be obfuscated, for example, by including the instructions in an encrypted file, or by applying various code obfuscation techniques to script code that might otherwise be visible in HTML code received by the client device 112. In other cases, the time-based transformation instructions 120 may be provided separately from the web page 116, although the web page 116 may contain a link or other mechanism for accessing or downloading the time-based transformation instructions 120. An embodiment might, for example, provide link transformation instructions subsequent to an authentication process for a user or user account associated with the client device 112.

A copy of the embedded link 118 may be transmitted by the client device 112 in a request for the resource 106. After expiration of the initial time period, the perimeter server 100 may direct the request to a dead-end 104 rather than to the resource 106. Direction of the request to the dead-end 104 may result in the content server 102 denying the request, or in the content server 102 returning some other content in its place.

The perimeter server 100 may allow access to the resource 106 by determining that the target of a request, as specified in a link, conforms to a transformation of a baseline link that is valid at the time the request is received. If the request is conformant, the perimeter server 100 may determine the actual location of the link by mapping from the transformed version of the link to another link that the content server 102 may use to identify and retrieve the resource 106. The transformed version of the link may be described as corresponding to the resource 106, while the mapped link may refer to a storage location of the resource 106. The mapped link might, for example, comprise a file system location of the resource 106. The embedded link 118 may exclude such location information in order preclude various approaches to unauthorized link sharing.

Figure 2:
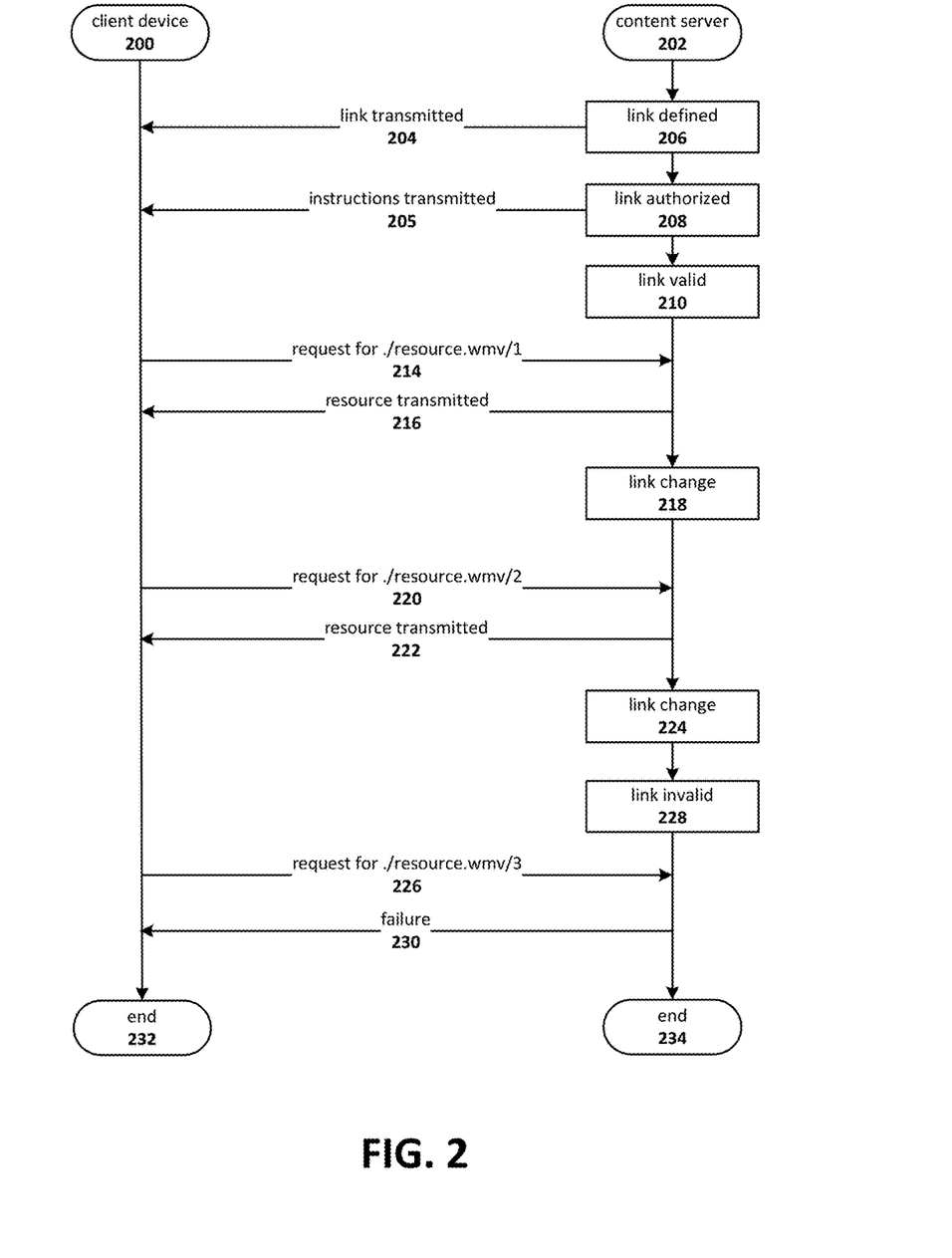
FIG. 2 is a call-flow diagram depicting an example of interaction between a client and server.

FIG. 2 is a call-flow diagram depicting interaction between a client device such as, for example, a client device 112 executing a web browser, and a server such as, for example, the content server 102, where requests to access a resource are performed using a time-based transformation of an identifier of the resource. Although FIG. 2 is depicted as a sequence of interactions, the depicted sequence is intended to be illustrative of various aspects of the present disclosure, and should not be viewed as limiting the scope of the present disclosure to those aspects that conform to the depicted sequence. In various embodiments, interaction between client and server similar to those depicted in FIG. 2 may occur in alternative orders, and in some cases the depicted interactions may be altered, omitted, reordered, or performed in parallel.

FIG. 2 depicts an example sequence of interactions between a client device 200 and a content server 102. The element representing the client device 200 depicts interactions from the perspective of the client device 200. The element representing the content server 202 depicts interactions from the perspective of the content server 202.

The element 206 ("link defined") indicates an event on the content server 202 in which an identifier of a resource has been defined, associated with a time-based transformation, and provided to a client, such as the client device 112, via an interaction 204 ("link transmitted").

The element 208 ("link authorized") indicates an event on the content server 202 in which the server determines that a client is authorized to access the resource referred to by the transmitted link. In response to the determination, an interaction 205 ("instructions transmitted") may cause the server to transmit instructions for performing a time-based transformation of the transmitted link.

The element 210 ("link valid") depicts an event on the content server 202 that corresponds to the link being treated as valid. In various cases and embodiments, a transmitted link may have an associated start time, prior to which a perimeter, such as the perimeter server 100 depicted in FIG. 1, may determine not to provide access to the resource that corresponds to the transmitted link. After this time, the perimeter may determine to provide access, provided that the received link has not expired and conforms to a time-based transformation for the period in which the link was received by the perimeter.

The elements 206 ("link defined"), 208 ("link authorized"), and 210 ("link valid") may, in various cases and embodiments, occur as part of a unified transaction on the server. In some cases and embodiments, some or all of the events corresponding to these elements may not be treated as distinct operations. For example, in some instances a link and associated instructions for performing a time-based transformation may be transmitted in a single unit.

An interaction 214 ("request for ./resource.wmv/1") may involve the client applying a time-based transformation to a base link received at an event 204 ("link transmitted"), and issuing a request for a resource directed to the transformed link. Embodiments may, for example, apply the time-based transformation to a base link, such as "./resource/.wmv," to produce the link "./resource/wmv/1."

Upon receipt of the transformed link, the server may validate that the transformed version of the link received in the request from the client corresponds to a transformed version of the link calculated by the server. The server may apply the transformation based on the time at which the request was received. If both transformed versions are comparable, an interaction 216 ("resource transmitted") may occur. In other words, if the transformed versions of the link reasonably correspond to each other, the requested content may be transmitted to the client device 112.

At an event 218 ("link change"), a time period applicable to a time-based transformation may have elapsed. As a result, an interaction 220 ("request for ./resource.wmv/2") may include a time-based transformation applicable to the next time period. The server may confirm that the received link corresponds to its own time-based transformation of the base link, and if so, transmit the resource at event 222 ("resource transmitted").

At an event 224 ("link change"), a second time period may have elapsed. Subsequent requests for the resource may be honored if directed to a version of the base link that is generated using the next time period. At an event 228 ("link invalid"), however, an expiration period may have elapsed. In various cases and embodiments, a link may be associated with an expiration policy, after which the link and its corresponding time-based transformation may no longer be valid. As a result, a third interaction 226 ("request for ./resource.wmv/3") may result in an event 230 ("failure"), even though the transformed link would otherwise be valid.

Elements 232 and 234 depict the end of the depicted client device 200 and content server 202 interaction. Further processing of requests to retrieve a resource from the content server 202 may proceed using interactions similar to those just described. In some cases, links may have windows of validity and invalidity. A time-based transformation may, in some of these cases, be utilized to determine if a link is valid during a given window of time.

Figure 3:
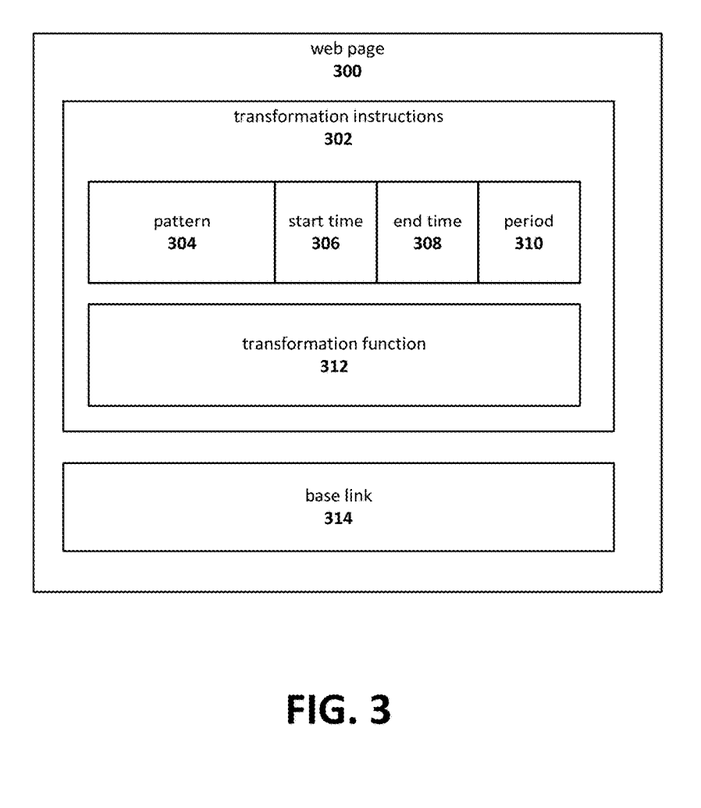
FIG. 3 is a block diagram depicting an example of a web page including a link protected by a time-based transformation.

FIG. 3 is a block diagram depicting an example of a web page that includes a base link and instructions for performing a time-based transformation of the base link. FIG. 3 depicts a web page as one example of utilizing a base link coupled with a time-based transformation of the link, which may be used to provide access to content while discouraging or preventing unauthorized access to the content. The use of a web page in FIG. 3 is intended to be illustrative of these concepts, and should not be viewed as limiting the scope of the present disclosure. The principles depicted in FIG. 3 may be applied to a wide variety of mechanisms and formats for exchanging link information.

In FIG. 3, a web page 300 may comprise markup language information data. For example, the web page 300 may contain hypertext markup language ("HTML") and/or extensible markup language ("XML") data. Embedded in markup data may be a base link 314. The base link 314 may be a complete or an incomplete link to a resource. The base link 314 may be formed into a usable link—that is to say one that may be successfully used to access a corresponding resource during a time window—if processed according to time-based transformation instructions 302.

Time-based transformation instructions 302 may comprise a transformation function 312 and additional information, such as, for example, a pattern 304, a start time 306, an end time 308, and a period 310.

A pattern 304 may include information indicative of a transformation of the base link 314. This could, for example, include a regular expression or a substitution pattern that might be appended to the base link 314 and transformed using transformation function 312. For example, the base link 312 might be "./content/example.html/" and the pattern 302 might be "{0}," where {0} could be substituted with a current time modulo a time interval, and the result appended to the base link.

A transformation function 312 may include compiled or interpreted code, pattern indicators such as regular expressions, information referring to a service for transforming a base pattern, and so forth. A service for transforming a base pattern might comprise a link to a web service which performs a transformation. Various other approaches to providing instructions may be provided. In some cases, the transformation function 312 can comprise an enumeration value indicating a pre-defined transformation function. In other cases, the transformation function 312 can comprise code for determining the result of a formula or mathematical expression. For example, the transformation function 312 might calculate a result of the expression "t % x," where "%" is a modulo operator, "t" is a current time, and "x" is a time interval.

Parameters to the transformation function 312 may include a start time 306, an end time 308, and a period 310. The start time 306 and the end time 308 may define a validity period for the link during which the link can be considered valid when presented at the content server 102. The period 310 may indicate a length of time during which a transformed version of a link is usable to access a resource hosted on a content server. For example, the period 310 may be five minutes which indicates that a transformed link will be valid for a period of five minutes after which a new transformed link must be formed.

Figure 4A:
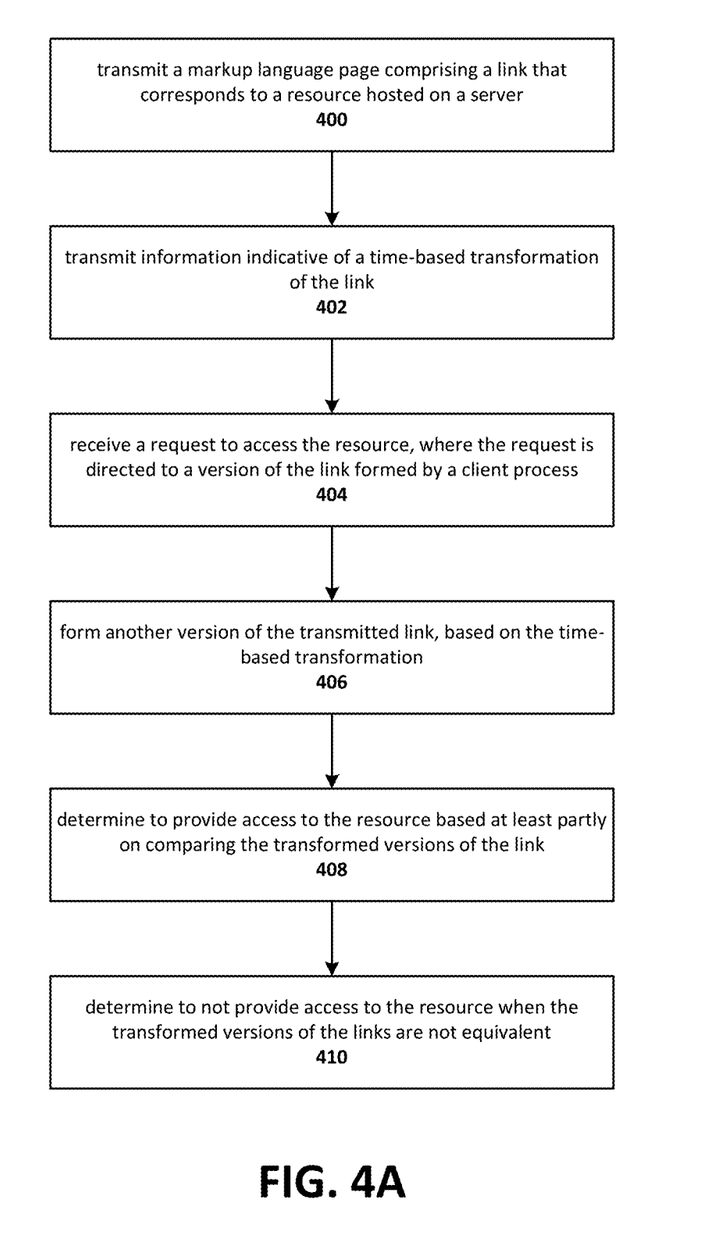
FIG. 4A is a flow diagram depicting an example of a process for protecting access to content using a time-based transformation of a link.

FIG. 4A is a flow diagram depicting an example process for protecting access to content, including minimizing effects of link sharing, using a time-based transformation of a link. Although FIG. 4A is depicted as a sequence of blocks, the depicted sequence should not be construed as limiting the scope of the present disclosure. In various cases, aspects, and embodiments, the blocks and depicted operations may be altered, omitted, reordered, or performed in parallel.

The operations depicted in FIG. 4A may be performed, for example, by the content server 102 or one or more modules or processes associated with the content server 102. For example, a processing pipeline of a content server 102 may allow integration with a module configured to perform some or all of the operations depicted in FIG. 4A. In another example, a front-end server may be interposed between the client and the content server 102. The following description of FIG. 4A refers to various operations that may be performed by a server. However, it will be appreciated that some or all of the operations may, in various embodiments, be performed by other processes or modules. It will also be appreciated that, although the description of FIG. 4A refers to a server, more than one server may be employed.

At block 400, the content server 102 may generate and transmit to the client device 112 a markup language page that contains a link that corresponds to a resource hosted on the server 102. The server 102 may host various resources, including, but not limited to, HTML data, XML data, script files, media files, web services, and executable code files. These may comprise markup language pages or may be used to generate a markup language page to be transmitted to a client. The markup language page may contain an embedded link that corresponds to another resource on the same server or on a different server. The embedded link may uniquely identify the resource. However, in various cases the embedded link may not be directly usable to access the resource to which the embedded link corresponds. Rather, a time-based transformation may need to be applied to the embedded link in order to enable it for use in accessing the resource from the content server 102.

At block 402, the content server 102 may transmit to the client device 112 information indicative of a time-based transformation that the client device 112 may be applied to the transmitted link. For example, content server 102 may insert instructions into the HTML file that specify how the link is to be changed over time. The client device 112 may use the instructions to transform the transmitted link—which may be received from the server 102—to a version of the transmitted link that may be used to access the content.

At block 404, the content server 102 may receive a request to access the resource from the client device 112. The request to access the resource may be directed to a version of the transmitted link that has been transformed by the client, using the information received from the server that describes the time-based transformation.

At block 406, the content server 102 may form another version of the transmitted link based on the time-based transformation. Application of the time-based transformation may depend on a time at which the request to access the resource was received. As a result, the version of the transmitted link may correspond to the time window in which it is formed.

At block 408, the content server 102 may determine to provide access to the resource requested in an operation depicted by the block 404. The determination may be based on the version of the transmitted link, as formed by the server, being compared to the version of the link received in the request from the client.

At block 410, the server 102 may determine not to provide access to the resource when the transformed versions of the link are not equivalent. Comparison of the transformed versions of the links may involve full or partial equivalence. Embodiments may permit access based on approximate equivalence, e.g., when a client submits a transformed version of a link that is misaligned with the version expected by the server. For example, due to factors such as clock misalignment, a server might expect a version of a link that was transformed based on clock period N, but might receive from a client a version of the link that was transformed based on clock period N+1. The server might permit access to the resource in this case, but not, for example, if the client version corresponded to N+2. Other tolerances, or no tolerance, of deviation from the expected transformation might be applied.

Figure 4B:
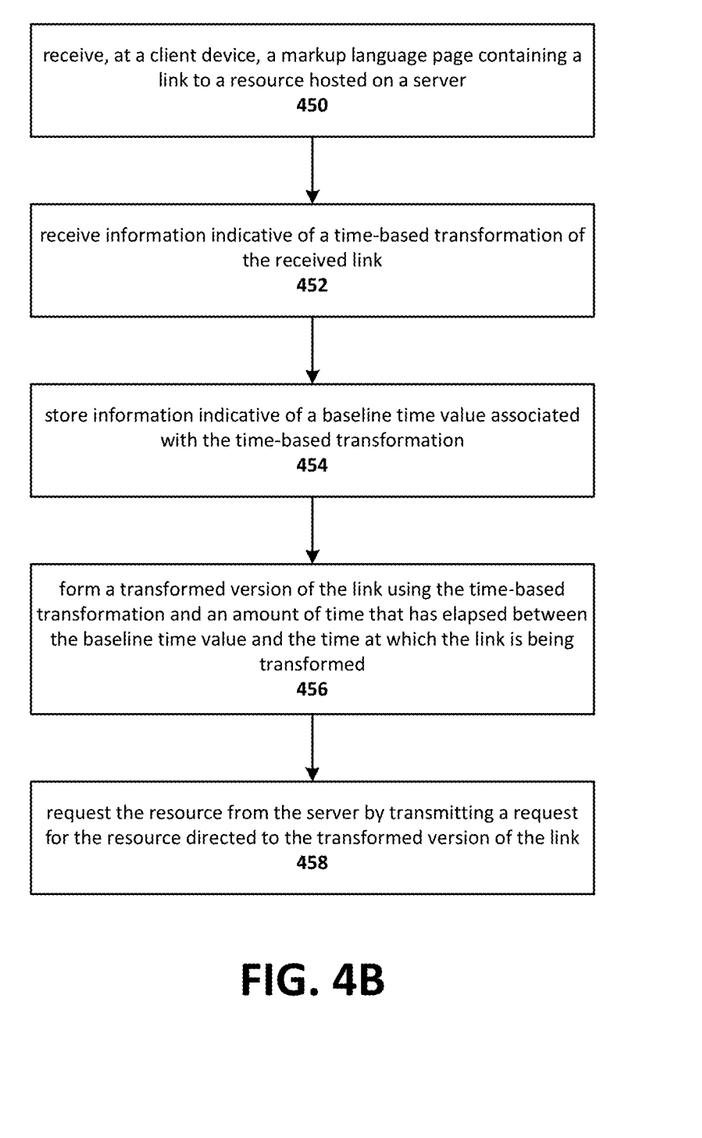
FIG. 4B is a flow diagram of a process for requesting a resource protected by a time-based transformation of a link.

FIG. 4B depicts a flow diagram of a process performed by a client device 112 for requesting a resource protected using a time-based transformation of a link. Although FIG. 4B is depicted as a sequence of blocks, the depicted sequence should not be construed as limiting the scope of the present disclosure. In various cases, aspects, and embodiments, the blocks and depicted operations may be altered, omitted, reordered, or performed in parallel.

The following description of operations depicted by FIG. 4B may refer to operations performed by a browser. This may include various code modules that might be downloaded from a server and performed in an execution context of a browser. In various embodiments, various devices or computer processes other than browsers may be utilized, including but not limited to media players, content retrieval applications, operating systems, and so on. These may be referred to as clients of the server. The use of a browser process with FIG. 4B may therefore be understood to be for illustrative purposes, and should not be viewed as limiting the scope of the present disclosure.

At block 450, a client device 112 may receive a markup language page that contains a link to a resource hosted on content server 102. The link may comprise a base link that may be transformed by a time-based transformation and transmitted to a server in a request to access the resource.

At block 452, the client device 112 may receive information indicative of a time-based transformation that may be applied to a link included in a markup language page, or a link otherwise made available to the browser. In some cases and embodiments, the page with the link may also include the instructions indicative of a time-based transformation, such as an interpreted, compiled, or intermediate-language code module. In other cases and embodiments, the information might be distributed separate from the link. This might include receiving the instructions after transmitting credentials to the server. The content server 102 might validate the credentials to verify that a user associated with the client device 112 is authorized to access the content, and then transmit the instructions. The instructions might be selected based on the credentials of the user, so that different instruction sets, e.g., those valid for differing lengths of time, might be transmitted from the server and received by the client device 112.

Block 454 depicts the client device 112 storing information indicative of a baseline time. The baseline time may be associated with the instructions for performing a time-based transformation. The instructions for performing the time-based transformation may be performed with respect to the baseline time and a time at which the transformation is performed, or the time at which the resource is to be requested.

At block 456, the client device 112 may form a transformed version of the link, using the time-based transformation and an amount of time that has elapsed between the baseline time and the time at which the transformation is performed. The transformation may also be performed based on time that has elapsed between the baseline time and the time at which the resource is to be requested.

At block 458, the client device 112 may request the resource from the content server 102. The client device may request the resource by transmitting, to the server, a request directed to the transformed link. In some cases, the request may be addressed to a target other than the transformed link, but include the transformed link as a payload. In either case, the server may then compare the transformed link to its own version of the link, transformed based at least in part on the time at which the request was received. The content server 102 may then permit access if it determines that the two transformed versions are equivalent or approximately equivalent within a given tolerance.

In an embodiment, a content server 102 may include embedded links in the content it serves. The embedded links may be transformed according to a time-based transformation. The time-based transformation may be applied by the server and embedded in served content. For example, the content server 102 may receive a request to access a web page that contains a link to a media file. The content server 102 may form or reform the web page so that the link to the media file embedded in the web page is transformed according to a time-based transformation. This may reduce effects that may occur if the link to the media file is shared. A recipient of the shared link may have access to the transformed version of the link to the media file, but not to the original link or to the time-based transformation. As a result, the recipient of the transformed link may be unable to access the media file.

In an embodiment, a content server 102 may associate a time-based transformation with a link that is indicative of a first resource accessible on or through content server 102. The content server 102 may receive a request to access the first resource. The request may comprise a version of the link that has been transformed according to the time based transformation. The content server 102 may permit access to the first resource by comparing the received version of the link to a second version of the link, where the second version is transformed according to the time-based transformation. The time-based transformation of the second link may be based, for example, on the time at which the request to access the first resource was received.

In some instances, the content server 102 may receive a request from a client device, such as client device 110, to access a second resource, where the second resource comprises a link to the first resource. The content server 102 may, in response to the request, form a version of the second resource that includes an embedded link to the first resource that has been transformed according to the time-based transformation. The version of the second resource may be provided to the client device. If the client device requests access to the first resource using the embedded link, content server 102 may determine to permit access to the first resource by comparing the received version of the link to a transformed version of the link calculated relative to a time such as when the request to access the first resource was received.

In an embodiment, a content server 102 may provide access to media files using links that change over time. This may involve the content server 102 returning segments of a media file requested by the client device 112, where the segments are shorter than the running length of the media file. The next segment of the media file may be requested by the client device 112 using a link transformed for the next time period. The server 102 may determine which subset of the media file to return based on the received version of the transformed linked. This configuration may permit controlling access to media files through a mechanism that is lightweight relative to digital rights management techniques. The configuration may also allow for sharing of a links to a subset of a media file (for example links to the first five minutes of a movie), while discouraging or preventing the sharing of links to the media file as a whole. Media players may be configured to retrieve portions of the media file using time-based transformations of a base link, while still allowing for smooth playback of the media file.

In an embodiment, a computer-implemented method may be used in conjunction with embedding links to resources in markup language pages. The method may be used to cause a reduced effect of unauthorized link sharing. The method may comprise transmitting a markup language page comprising a link where the link corresponds to a resource hosted by a server. The server may transmit information that is indicative of a time-based transformation of the link. The server may receive a request to access the resource, where the request comprises a first transformed version of the link. The server may form a second transformed version of the link, using the time-based transformation and a time the request to access the resource was received. The server may determine to provide access to the resource based on identifying equivalence between the first transformed version of the link to the second transformed version of the link.

Various aspects of the computer-implemented method may be combined in various ways with various additional aspects. The inclusion of an aspect in an embodiment should not be construed as precluding other aspects from incorporation into the embodiment. Furthermore, the inclusion of an aspect in an embodiment should not be construed as requiring the inclusion of any other aspect.

In an aspect of the computer-implemented method, the information indicative of a time-based transformation may comprise instructions for forming a time-based transformation of the link.

In another aspect, the computer-implemented method may comprise receiving an additional request to access the resource, where the additional request comprises an additional link. The aspect may further comprise rejecting the additional request based at least in part on determining that the additional link does not conform to a version of the link formed using the time-based transformation, wherein the time-based transformation is applied with respect to a time at which the additional request was received.

In another aspect, a method may further comprise processing the request to access the resource by at least, in response to the determining to provide access to the resource, mapping the first transformed version of the link to a location of the resource.

In another aspect, the information indicative of the time-based transformation may be transmitted in response to verifying that a user is authorized to access the resource.

In another aspect, a method may comprise forming the second transformed version of the link by at least applying the time-based transformation to the link based at least in part on time that has elapsed since an initial use of the first transformed version of the link to access the resource.

In another aspect, a method may comprise determining to allow access to the resource based at least in part on time that has elapsed since a start time being greater than a threshold amount of time.

In another aspect, the determining to provide access to the resource may be based at least in part on a time that has elapsed since transmitting the first link being less than a threshold amount of time.

In another aspect, the time-based transformation may comprise a function accepting as input a number of time periods that have elapsed since a baseline time.

In another aspect, the a method may comprise setting a time period of the time-based transformation to be less than a first running length of a multimedia file and greater than a running length of a subset of the multimedia file.

In an embodiment, a non-transitory computer-readable storage medium may have stored thereon, or a computer program product may comprise, instructions that, upon execution by one or more computing devices, cause the one or more computing devices at least to perform operations for protecting access to linked resources. The operations may comprise transmitting information indicative of a time-based transformation of a link, where the link identifies a resource accessible on a server for a first time period. The operations may further comprise receiving a request to access the resource, where the request comprises a first transformed version of the link. The operations may further comprise determining to permit access to the resource based at least in part on comparing the first transformed version of the link to a second transformed version of the link formed by at least applying the time-based transformation to the link.

Various additional aspects of the computer-readable storage medium or computer program product may be formed by the inclusion of instructions for performing the additional aspects. These aspects may be combined in various ways. The inclusion of an aspect in an embodiment should not be construed as precluding other aspects from incorporation into the embodiment. Furthermore, the inclusion of an aspect in an embodiment should not be construed as requiring the inclusion of any other aspect.

In an aspect, the information indicative of a time-based transformation may comprise computer-executable instructions for forming a new version of the link.

In an aspect, further instructions may be included in a computer-readable storage medium. The instructions, when executed, may cause a computing device to at least receive an additional request to access the resource, the additional request comprising an additional link. The instructions may further cause the computing device to reject the additional request based at least in part on determining that the additional link does not conform to a transformed version of the link formed based at least in part on an amount of time that has elapsed since a baseline time.

In an aspect, further instructions may be included in a computer-readable storage medium. The instructions, when executed, may cause a computing device to at least intercept the request to access the resource. The computing device may then process the request to access the resource by at least mapping the first transformed version of the link to a location of the resource, wherein the mapping comprises extracting a base link from the first transformed version of the link.

In another aspect, the information indicative of the time-based transformation may be transmitted in response to verifying that a user is authorized to access the resource.

In another embodiment, a computer-implemented method for accessing a protected resource hosted on a server may comprise receiving a link identifying a resource hosted on the server, and receiving information indicative of a time-based transformation of the link. The method may further comprise storing information that indicates a baseline time value associated with the time-based transformation of the link. The method may further comprise forming a transformed version of the link based at least in part on the information indicative of the time-based transformation and time that has elapsed between the baseline time and a time of forming the transformed version of the link. The method may further comprise requesting the resource from the server by at least transmitting a request for the resource, the request comprising the transformed version of the link.

Various aspects of the computer-implemented method may be combined in various ways with various additional aspects. The inclusion of an aspect in an embodiment should not be construed as precluding other aspects from incorporation into the embodiment. Furthermore, the inclusion of an aspect in an embodiment should not be construed as requiring the inclusion of any other aspect.

In an aspect, a method may comprise receiving page markup data comprising the link and the information indicative of the time-based transformation.

In an aspect, the information indicative of a time-based transformation of the link, as received by the browser from the server, may comprise computer-executable instructions for forming versions of the link.

In an aspect, the receiving information indicative of a time-based transformation of the link may be in response to transmitting credentials to the server.

In an aspect, a method may comprise transmitting a first request to receive a first subset of the resource. The first request may comprise the transformed version of the link. The method may further comprise transmitting a second request to receive a second subset of the resource. The first and second subsets of the resource may, in some cases, not wholly overlap. The second request may comprise an additional transformed version of the link that is based at least in part on the time-based transformation.

Figure 5:
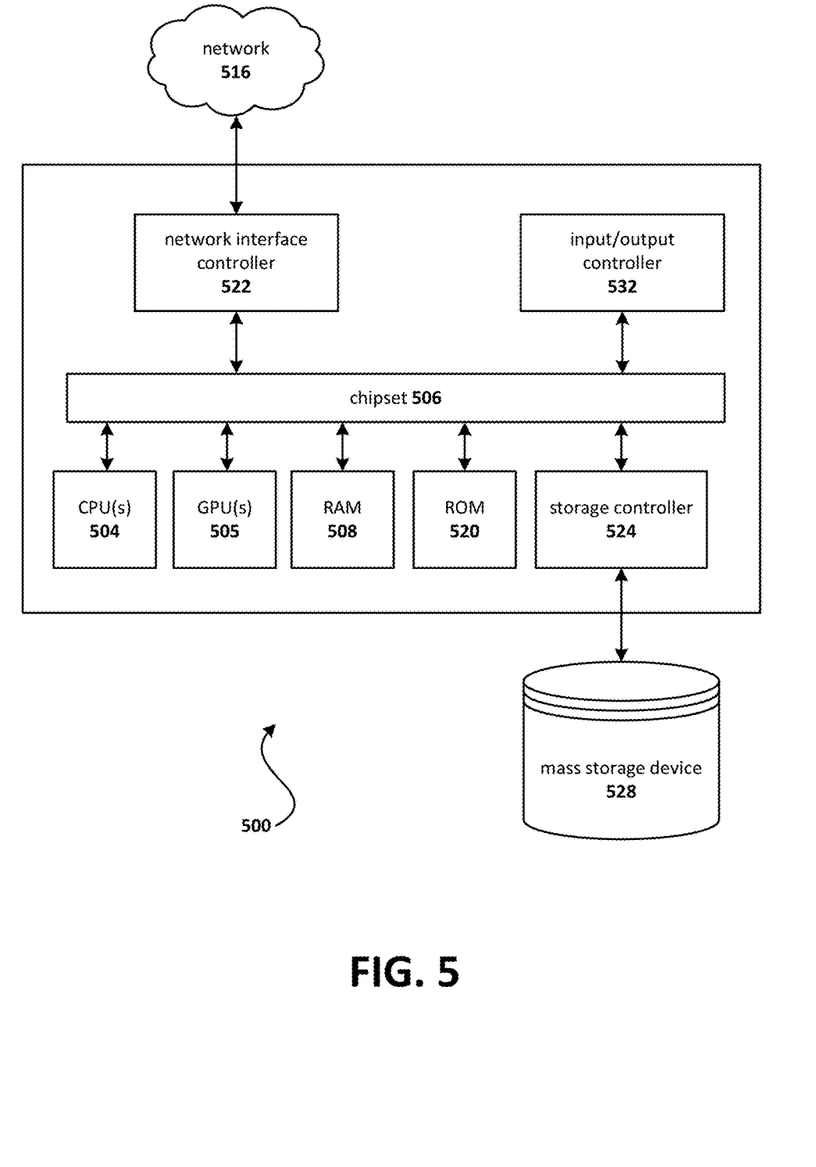
FIG. 5 is a block diagram depicting various aspects of a computing environment in which aspects of the present disclosure may be practiced.

FIG. 5 depicts a computing device that may be used in various aspects, such as the servers depicted in FIG. 1. With regard to the example architecture of FIG. 1, the perimeter server 100, the content server 102, and other computing devices, such as those on which the client devices 110 and 112 may operate, may each be implemented in an instance of a computing device 500 of FIG. 5. The computer architecture shown in FIG. 5 illustrates a conventional server computer, workstation, desktop computer, laptop, tablet, network appliance, PDA, e-reader, digital cellular phone, or other computing node, and may be utilized to execute any aspects of the computers described herein, such as to implement the operating procedures of FIGS. 4A-4B.

The computing device 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may, in various embodiments, be augmented with or replaced by other processing units, such as GPU(s) 505. The GPU(s) 505 may comprise processing units specialized for but not necessarily limited to highly parallel computations, such as graphics and other visualization-related processing.

A chipset 506 may provide an interface between the CPU(s) 504 and the remainder of the components and devices on the baseboard. The chipset 506 may provide an interface to a random access memory (RAM) 508 used as the main memory in the computing device 500. The chipset 506 may further provide an interface to a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein.

The computing device 500 may operate in a networked environment using logical connections to remote computing nodes and computer systems through local area network (LAN) 516. The chipset 506 may include functionality for providing network connectivity through a network interface controller (NIC) 522, such as a gigabit Ethernet adapter. A NIC 522 may be capable of connecting the computing device 500 to other computing nodes over a network 516. It should be appreciated that multiple NICs 522 may be present in the computing device 500, connecting the computing device to other types of networks and remote computer systems.

The computing device 500 may be connected to a mass storage device 528 that provides non-volatile storage for the computer. The mass storage device 528 may store system programs, application programs, other program modules, and data, which have been described in greater detail herein. The mass storage device 528 may be connected to the computing device 500 through a storage controller 524 connected to the chipset 506. The mass storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 528 is characterized as primary or secondary storage and the like.

For example, the computing device 500 may store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may further read information from the mass storage device 528 by detecting the physical states or characteristics of one or more particular locations within the physical storage units.

In addition to the mass storage device 528 described above, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

A mass storage device, such as the mass storage device 528 depicted in FIG. 5, may store an operating system utilized to control the operation of the computing device 500. According to one embodiment, the operating system comprises a version of the LINUX operating system. According to another embodiment, the operating system comprises a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 528 may store other system or application programs and data utilized by the computing device 500.

The mass storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described above. The computing device 500 may have access to computer-readable storage media storing computer-executable instructions, which, when executed by the computing device 500, may perform operating procedures depicted in FIGS. 4A-4B.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that can be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that can be performed it is understood that each of these additional operations can be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   transmitting a markup language page comprising a link that identifies a resource hosted by a server;

transmitting information usable to apply a time-based transformation of the link;
receiving a request to access the resource, wherein the request comprises a first transformed version of the link generated based on an application of the time-based transformation of the link;
generating a second transformed version of the link by applying the time-based transformation of the link based at least in part on a time that the request to access the resource was received; and
authorizing access to the resource based at least in part on determining that the first transformed version of the link matches the second transformed version of the link.

2. The method of claim 1, wherein the information usable to apply the time-based transformation comprises instructions for transforming the link based at least on the link, a start time, and a time period.

3. The method of claim 1, further comprising:
receiving an additional request to access the resource, wherein the additional request comprises an additional link; and
rejecting the additional request based at least in part on determining that the additional link does not conform to a version of the link formed using the time-based transformation, wherein the time-based transformation is applied with respect to a time at which the additional request was received.

4. The method of claim 1, further comprising:
processing the request to access the resource by at least, in response to the authorizing access to the resource, mapping the first transformed version of the link to a location of the resource.

5. The method of claim 1, further comprising verifying that a user is authorized to access the resource, wherein the transmitting of the information usable to apply the time-based transformation is performed in response to verifying that a user is authorized to access the resource.

6. The method of claim 1, further comprising:
forming the second transformed version of the link by at least applying the time-based transformation to the link based at least in part on time that has elapsed since an initial use of the first transformed version of the link to access the resource.

7. The method of claim 1, further comprising:
determining to authorize access to the resource based at least in part on time that has elapsed since a start time being greater than a threshold amount of time.

8. The method of claim 1, wherein the authorizing access to the resource is based at least in part on a time that has elapsed since transmitting the first link being less than a threshold amount of time.

9. The method of claim 1, wherein the time-based transformation comprises a function accepting as input a number of time periods that have elapsed since a baseline time.

10. The method of claim 1, wherein the resource corresponds to a portion of a multimedia file, the method further comprising:
setting a time period of the time-based transformation to be less than a first running length of a multimedia file and greater than a running length of a subset of the multimedia file.

11. A method comprising:
associating information usable by a client to apply a time-based transformation of a hyperlink with a link indicative of a resource accessible on a server;
receiving a request to access the resource, the request comprising a first transformed version of the link generated based on an application of the time-based transformation to the link; and
permitting access to the resource based at least in part on comparing the first transformed version of the link to a second transformed version of the link, wherein the second transformed version of the link is generated by at least applying the time-based transformation to the link based on a time that request to access the resource was received.

12. The method of claim 11, further comprising:
receiving a second request to access a second resource, wherein the second resource comprises a link to the resource;
forming a version of the second resource comprising the first transformed version of the link; and
transmitting the second resource to a client.

13. The method of claim 11, further comprising:
receiving an additional request to access the resource, the additional request comprising an additional link; and
rejecting the additional request based at least in part on determining that the additional link does not conform to a second transformed version of the link formed based at least in part on an amount of time that has elapsed since a baseline time.

14. The method of claim 11, further comprising:
intercepting the request to access the resource; and
processing the request to access the resource by at least mapping the first transformed version of the link to a location of the resource, wherein the mapping comprises extracting a base link from the first transformed version of the link.

15. The method of claim 11, wherein permitting access to the resource based at least in part on comparing comprises determining that the first transformed version of the link matches the second transformed version of the link and transmitting the resource in response to the determining.

16. A method comprising:
receiving a link that is indicative of a resource hosted on a server;
receiving information usable to apply a time-based transformation of the link;
storing information indicative of a baseline time value associated with the time-based transformation of the link;
forming a transformed version of the link based at least in part on the information indicative of the time-based transformation and time that has elapsed between the baseline time and a time of forming the transformed version of the link; and
requesting the resource from the server by at least transmitting a request for the resource, the request comprising the transformed version of the link.

17. The method of claim 16, further comprising:
receiving page markup data comprising the link and the information indicative of the time-based transformation.

18. The method of claim 16, wherein the information usable to apply the time-based transformation comprises instructions for applying a time-dependent function to the link.

19. The method of claim 16, wherein the receiving information indicative of the time-based transformation of the link is in response to transmitting credentials to the server.

20. The method of claim 16, further comprising:
transmitting a first request to receive a first subset of the resource, wherein the first request comprises the transformed version of the link; and
transmitting a second request to receive a second subset of the resource, the first and second subsets not wholly overlapping, the second request comprising an additional transformed version of the link based at least in part on the time-based transformation.

* * * * *